(12) United States Patent
Jung et al.

(10) Patent No.: US 12,441,827 B2
(45) Date of Patent: Oct. 14, 2025

(54) METHOD OF PREPARING VINYL CYANIDE COMPOUND-CONJUGATED DIENE RUBBER-AROMATIC VINYL COMPOUND GRAFT COPOLYMER AND METHOD OF PREPARING THERMOPLASTIC RESIN COMPOSITION INCLUDING THE SAME

(71) Applicant: LG CHEM, LTD., Seoul (KR)

(72) Inventors: Yu Sung Jung, Daejeon (KR); Joo Byung Chai, Daejeon (KR); Jong Beom Kim, Daejeon (KR); Taeyoung Jeon, Daejeon (KR); In Seok Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 533 days.

(21) Appl. No.: 17/913,250

(22) PCT Filed: Aug. 19, 2021

(86) PCT No.: PCT/KR2021/010994
§ 371 (c)(1),
(2) Date: Sep. 21, 2022

(87) PCT Pub. No.: WO2022/085913
PCT Pub. Date: Apr. 28, 2022

(65) Prior Publication Data
US 2023/0134396 A1    May 4, 2023

(30) Foreign Application Priority Data

Oct. 23, 2020   (KR) .................. 10-2020-0138217
Aug. 17, 2021   (KR) .................. 10-2021-0107841

(51) Int. Cl.
*C08F 279/04*    (2006.01)
*C08F 6/22*      (2006.01)
*C08L 55/02*     (2006.01)

(52) U.S. Cl.
CPC .............. *C08F 279/04* (2013.01); *C08F 6/22* (2013.01); *C08L 55/02* (2013.01);
(Continued)

(58) Field of Classification Search
CPC .. C08F 279/04; C08F 6/22; C08F 4/40; C08F 136/06; C08F 265/06; C08F 2/22;
(Continued)

(56) References Cited

U.S. PATENT DOCUMENTS

| 5,225,494 A | 7/1993 | Ishiga |
| 5,955,540 A * | 9/1999 | Dion ..................... C08L 51/04 525/71 |

(Continued)

FOREIGN PATENT DOCUMENTS

| CN | 107001544 A | 8/2017 |
| CN | 110662780 A | 1/2020 |

(Continued)

OTHER PUBLICATIONS

International Search Report and Written Opinion issued in corresponding International Patent Application No. PCT/KR2021/010994, dated Nov. 29, 2021.

(Continued)

*Primary Examiner* — Alicia Bland
(74) *Attorney, Agent, or Firm* — Morgan, Lewis & Bockius LLP

(57) ABSTRACT

Disclosed is a method of preparing a vinyl cyanide compound-conjugated diene rubber-aromatic vinyl compound graft copolymer and a method of preparing a thermoplastic resin composition including the same. Also disclosed is a conjugated diene rubber latex having an average particle diameter of 2,400 to 2,800 Å added to enlarged conjugated diene rubber latex obtained by enlarging conjugated diene rubber latex having an average particle diameter of 2,400 to (Continued)

2,800 Å using a polymer coagulant to prepare bimodal conjugated diene rubber, and a vinyl cyanide compound-conjugated diene rubber-aromatic vinyl compound graft copolymer prepared by graft-polymerizing the bimodal conjugated diene rubber.

13 Claims, 3 Drawing Sheets

(52) U.S. Cl.
CPC ..... *C08L 2201/52* (2013.01); *C08L 2205/025* (2013.01); *C08L 2205/18* (2013.01)

(58) Field of Classification Search
CPC ................ C08F 212/08; C08F 220/44; C08F 220/1804; C08F 220/06; C08F 4/28; C08L 55/02; C08L 2201/52; C08L 2205/025; C08L 2205/18; C08L 25/12; B29C 48/04; B29K 2027/06
See application file for complete search history.

(56) References Cited

U.S. PATENT DOCUMENTS

| 6,656,999 | B1 | 12/2003 | Lee | |
|---|---|---|---|---|
| 2005/0234192 | A1* | 10/2005 | Yamaguchi | C08L 25/12 525/71 |
| 2017/0107373 | A1* | 4/2017 | Matsuyama | C08L 69/00 |
| 2017/0260303 | A1 | 9/2017 | Chung et al. | |
| 2019/0185606 | A1 | 6/2019 | Jung et al. | |
| 2020/0140597 | A1* | 5/2020 | Jeon | C08F 265/06 |
| 2020/0165440 | A1 | 5/2020 | Kim et al. | |
| 2021/0230334 | A1 | 7/2021 | Suk et al. | |

FOREIGN PATENT DOCUMENTS

| CN | 111566136 A | 8/2020 |
|---|---|---|
| EP | 3 626 754 A1 | 3/2020 |
| JP | H0-725853 B2 | 3/1995 |
| JP | H0-8157502 A | 6/1996 |
| JP | 2002-212375 A | 7/2002 |
| JP | 2009-046602 A | 3/2009 |
| KR | 10-2003-0051980 A | 6/2003 |
| KR | 10-0384375 B1 | 8/2003 |
| KR | 10-2005-0062552 A | 6/2005 |
| KR | 10-0576312 B1 | 5/2006 |
| KR | 10-0591039 B1 | 6/2006 |
| KR | 10-2006-0119255 A | 11/2006 |
| KR | 10-2009-0108774 A | 10/2009 |
| KR | 10-1115798 B1 | 3/2012 |
| KR | 10-2018-0073063 A | 7/2018 |
| KR | 10-2018-0080105 A | 7/2018 |
| KR | 10-2020-0005093 A | 1/2020 |
| KR | 10-2020-0036507 A | 4/2020 |
| KR | 10-2020-0064480 A | 6/2020 |
| WO | 2019/121647 A1 | 6/2019 |

OTHER PUBLICATIONS

Extended European Search Report issued in corresponding European Patent Application No. 21882986.9, dated Jul. 25, 2023.

* cited by examiner

[FIG. 1]
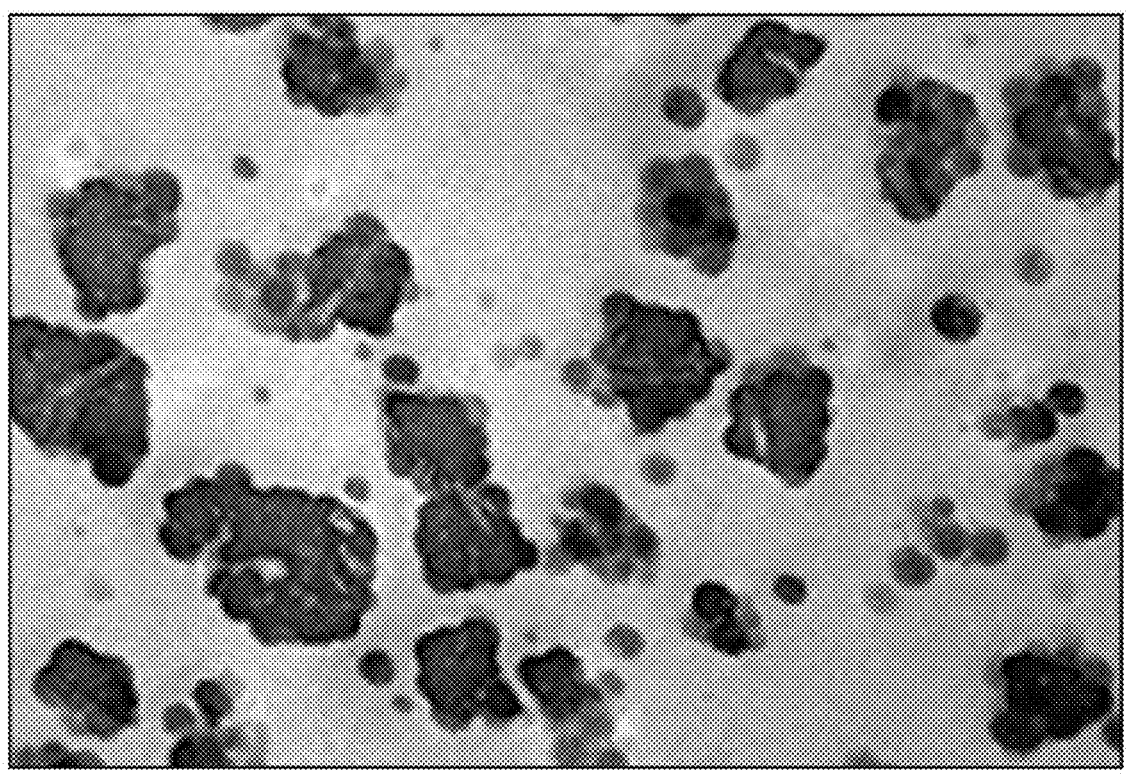

[FIG. 2]
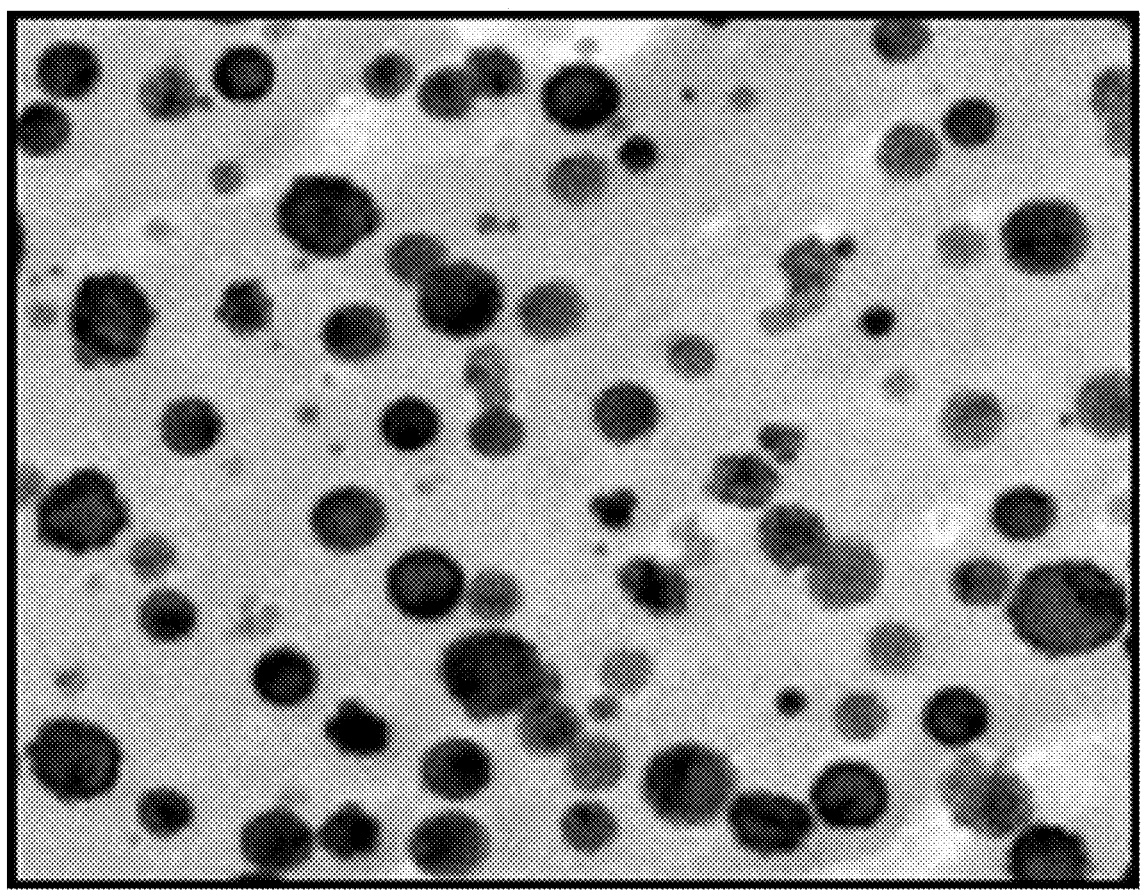

[FIG. 3]
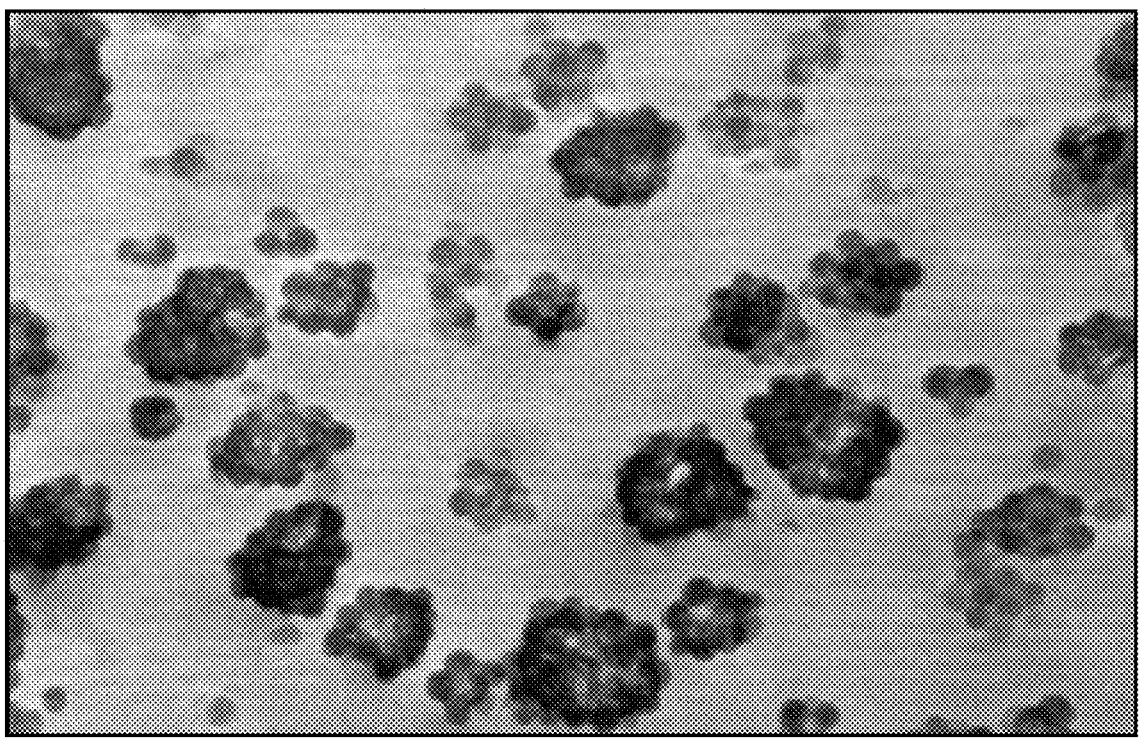

METHOD OF PREPARING VINYL CYANIDE COMPOUND-CONJUGATED DIENE RUBBER-AROMATIC VINYL COMPOUND GRAFT COPOLYMER AND METHOD OF PREPARING THERMOPLASTIC RESIN COMPOSITION INCLUDING THE SAME

CROSS-REFERENCE TO RELATED APPLICATIONS

The present application is a U.S. National Stage of PCT/KR2021/010994, filed on Aug. 19, 2021, which claims priority to Korean Patent Application No. 10-2020-0138217, filed on Oct. 23, 2020, and Korean Patent Application No. 10-2021-0107841, re-filed on Aug. 17, 2021, based on the priority of the above patent, in the Korean Intellectual Property Office, the disclosures of each of which are incorporated herein by reference.

TECHNICAL FIELD

The present invention relates to a method of preparing a vinyl cyanide compound-conjugated diene rubber-aromatic vinyl compound graft copolymer and a method of preparing a thermoplastic resin composition including the same. More particularly, according to the present invention, by preparing bimodal conjugated diene rubber including conjugated diene rubber latex and enlarged conjugated diene rubber latex obtained by enlarging conjugated diene rubber latex using a polymer coagulant, time for preparing the enlarged conjugated diene rubber may be reduced, and grafting efficiency may be increased, thereby improving both impact resistance and fluidity and showing a synergistic effect.

BACKGROUND ART

Conjugated diene rubber polymers represented by polybutadiene have excellent rubber properties, and thus have been used as an impact modifier for various thermoplastic resins, such as acrylonitrile-butadiene-styrene (hereinafter referred to as "ABS") resins and methyl methacrylate-butadiene-styrene (hereinafter referred to as "MBS") resins.

In the case of ABS resins, to secure impact resistance, the average particle diameter of polybutadiene rubber latex (hereinafter referred to as "PBL") should be 3,000 to 3,600 Å. However, to obtain large-diameter rubber as described above, polymerization time is usually 30 hours or more, and production efficiency is low. In addition, when a polymerization conversion rate is 90% or more, the polymerization conversion rate is rapidly reduced, and thus the polymerization conversion rate is not significantly increased even after more time is consumed.

To solve these problems, a method of increasing reaction temperature and reducing reaction time during polymerization has been used. In addition to disadvantages such as decrease in particle size and increase of reaction coagulants, accidents may be induced in a workplace due to increase in reaction pressure due to excessive reaction heat. Accordingly, it is not commercially easy to obtain high conversion rate and large-diameter PBL in a short reaction time.

In addition, to reduce reaction time, a method of preparing large-diameter PBL by polymerizing small-diameter PBL in a short time and then introducing an acid or a salt thereto to perform a enlarging process may be used. This method also causes excessive coagulation. In addition, the method has a limitation in preparing large-diameter PBL having an average particle diameter of 4,000 Å or more.

Therefore, there is a need to develop a preparation method capable of safely preparing large-diameter conjugated diene rubber latex having an average particle diameter 4,000 Å or more in a short time while securing impact resistance and fluidity.

RELATED ART DOCUMENTS

Patent Documents

KR 384375 B1

DISCLOSURE

Technical Problem

Therefore, the present invention has been made in view of the above problems, and it is one object of the present invention to provide a method of preparing a vinyl cyanide compound-conjugated diene rubber-aromatic vinyl compound graft copolymer having excellent impact resistance and fluidity, wherein the method is capable of reducing polymerization time and securing process safety and includes a step of preparing a bimodal conjugated diene rubber including conjugated diene rubber latex and enlarged conjugated diene rubber latex obtained by enlarging conjugated diene rubber latex using a polymer coagulant.

It is another object of the present invention to provide a method of preparing a thermoplastic resin composition having excellent impact resistance and fluidity by including a graft copolymer prepared by the above described method.

It is yet another object of the present invention to provide a thermoplastic resin composition including a graft copolymer including bimodal conjugated diene rubber, an aromatic vinyl compound, and a vinyl cyanide compound and an aromatic vinyl compound-vinyl cyanide compound copolymer, wherein the bimodal conjugated diene rubber includes, based on a total weight thereof, 85 to 97% by weight of conjugated diene rubber having an average particle diameter of 2,400 to 2,800 Å, 1 to 14% by weight of conjugated diene rubber having an average particle diameter of 5,800 to 8,500 Å, and 0.1 to 2% by weight of a polymer coagulant, and the thermoplastic resin composition has an Izod impact strength of 32 kgf·cm/cm or more as measured using a specimen having a thickness of ¼" according to ASTM D256.

The above and other objects can be accomplished by the present invention described below.

Technical Solution

In accordance with one aspect of the present invention, provided is a method of preparing a vinyl cyanide compound-conjugated diene rubber-aromatic vinyl compound graft copolymer, the method including step (a) of adding a polymer coagulant to a medium-diameter conjugated diene rubber latex having an average particle diameter of 2,400 to 2,800 Å to enlarge the medium-diameter conjugated diene rubber latex to prepare a large-diameter conjugated diene rubber latex having an average particle diameter of 5,800 to 8,500 Å; step (b) of adding a medium-diameter conjugated diene rubber latex having an average particle diameter of 2,400 to 2,800 Å to the prepared large-diameter conjugated diene rubber latex to prepare a bimodal conjugated diene rubber latex; step (c) of graft-polymerizing the prepared bimodal conjugated diene rubber latex, an aromatic vinyl compound, and a vinyl cyanide compound to obtain a vinyl cyanide compound-conjugated diene rubber-aromatic vinyl compound graft copolymer.

In accordance with another aspect of the present invention, provided is a method of preparing a thermoplastic resin composition, the method including preparing the vinyl cyanide compound-conjugated diene rubber-aromatic vinyl compound graft copolymer according to the method of the present invention; feeding 15 to 40% by weight of the prepared graft copolymer and 60 to 85% by weight of an aromatic vinyl compound-vinyl cyanide compound copolymer into an extruder, performing melt-kneading, and performing extrusion.

In accordance with yet another aspect of the present invention, provided is a thermoplastic resin composition including 15 to 40% by weight of a graft copolymer including a bimodal conjugated diene rubber, an aromatic vinyl compound, and a vinyl cyanide compound and 60 to 85% by weight of an aromatic vinyl compound-vinyl cyanide compound copolymer, wherein the bimodal conjugated diene rubber includes, based on a total weight thereof, 85 to 97% by weight of medium-diameter conjugated diene rubber having an average particle diameter of 2,400 to 2,800 Å, 1 to 14% by weight of large-diameter conjugated diene rubber having an average particle diameter of 5,800 to 8,500 Å, and 0.1 to 2% by weight of a polymer coagulant, and the thermoplastic resin composition has an Izod impact strength of 32 kgf·cm/cm or more as measured using a specimen having a thickness of ¼" according to ASTM D256.

Advantageous Effects

According to the present invention, by enlarging a conjugated diene rubber latex using a polymer coagulant, time for preparing a large-diameter conjugated diene rubber latex having an average particle diameter of 5,800 to 8,500 Å can be reduced. In addition, by including a bimodal conjugated diene rubber latex prepared by mixing the large-diameter conjugated diene rubber and non-enlarged conjugated diene rubber, a graft-polymerized vinyl cyanide compound-conjugated diene compound-aromatic vinyl compound graft copolymer having excellent grafting efficiency, fluidity, and impact resistance and showing a synergistic effect can be obtained.

DESCRIPTION OF DRAWINGS

FIG. 1 is a TEM image of a large-diameter rubber polymer enlarged using a polymer coagulant according to Preparation Example C1 of the present invention (Magnification: 25 k).

FIG. 2 is a TEM image of a large-diameter rubber polymer polymerized by direct polymerization according to Preparation Example C6 of the present invention (Magnification: 25 k).

FIG. 3 is a TEM image of a large-diameter rubber polymer enlarged using acetic acid according to Preparation Example C7 of the present invention (Magnification: 25 k).

BEST MODE

To improve the impact resistance and fluidity of an ABS graft copolymer, the present inventors tried to reduce time for preparing large-diameter conjugated diene rubber latex having an average particle diameter of 5,800 to 8,500 Å. As a result, when enlarged conjugated diene rubber latex was prepared by enlarging conjugated diene rubber latex using a polymer coagulant, and the enlarged conjugated diene rubber latex was added to non-enlarged conjugated diene rubber latex in a predetermined content to prepare bimodal conjugated diene rubber latex, fluidity was excellent, and impact strength was significantly improved. Based on these results, the present inventors conducted further studies to complete the present invention.

A method of preparing a graft copolymer and a method of preparing a thermoplastic resin composition according to the present invention will be described in detail.

Method of Preparing Vinyl Cyanide Compound-Conjugated Diene Rubber-Aromatic Vinyl Compound Graft Copolymer A method of preparing a vinyl cyanide compound-conjugated diene rubber-aromatic vinyl compound graft copolymer of the present invention includes step (a) of adding a polymer coagulant to a medium-diameter conjugated diene rubber latex having an average particle diameter of 2,400 to 2,800 Å to enlarge the medium-diameter conjugated diene rubber latex to prepare a large-diameter conjugated diene rubber latex having an average particle diameter of 5,800 to 8,500 Å; step (b) of adding a medium-diameter conjugated diene rubber latex having an average particle diameter of 2,400 to 2,800 Å to the prepared large-diameter conjugated diene rubber latex to prepare a bimodal conjugated diene rubber latex; and step (c) of graft-polymerizing 40 to 70% by weight (based on solids) of the prepared bimodal conjugated diene rubber latex, 15 to 45% by weight of an aromatic vinyl compound, and 5 to 25% by weight of a vinyl cyanide compound to obtain a vinyl cyanide compound-conjugated diene rubber-aromatic vinyl compound graft copolymer. In this case, large-diameter conjugated diene rubber latex may be prepared within a short time, and a graft copolymer including the large-diameter conjugated diene rubber latex may have excellent grafting efficiency, impact resistance, and fluidity, demonstrating a synergistic effect.

a) Enlarging Step

For example, in step (a), to prepare large-diameter conjugated diene rubber latex having an average particle diameter of 5,800 to 8,500 Å, a polymer coagulant is added to medium-diameter conjugated diene rubber latex having an average particle diameter of 2,400 to 2,800 Å to enlarge the medium-diameter conjugated diene rubber latex.

For example, in step (a), based on 100 parts by weight (based on solids) of the medium-diameter conjugated diene rubber latex, the polymer coagulant may be added in an amount of 0.3 to 1.6 parts by weight (based on solids), preferably 0.4 to 1.5 parts by weight (based on solids), more preferably 0.5 to 1 part by weight (based on solids), most preferably 0.5 to 0.8 parts by weight (based on solids) to perform enlarging. Within this range, enlarged rubber latex may be prepared within a short time, and formation of coagulum may be reduced.

In this description, average particle diameter may be weight average particle diameter. Average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz, and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 psec.

The medium-diameter conjugated diene rubber latex preferably has an average particle diameter of 2,500 to 2,700 Å. Within this range, large-diameter conjugated diene rubber latex may be efficiently enlarged within a short time, and thus productivity may be excellent.

The large-diameter conjugated diene rubber latex preferably has an average particle diameter of 6,000 to 8,200 Å, more preferably 6,100 to 8,000 Å, still more preferably 6,100 to 7,500 Å. Within this range, impact resistance and fluidity may be excellent.

For example, the polymer coagulant may have an average particle diameter of 700 to 1,700 Å, preferably 900 to 1,600 Å, more preferably 1,000 to 1,500 Å, still more preferably 1,100 to 1,400 Å. Within this range, conjugated diene rubber latex may be uniformly enlarged.

For example, the polymer coagulant may be a graft copolymer prepared by graft-polymerizing an alkyl acrylate compound and a carboxylic acid-based compound onto a core obtained by polymerizing one or more selected from the group consisting of alkyl acrylate compounds and carboxylic acid-based compounds, preferably a graft copolymer prepared by graft-polymerizing an alkyl acrylate compound and a carboxylic acid-based compound onto a core obtained by polymerizing an alkyl acrylate compound. In this case, an excellent enlarging effect may be obtained, and fluidity and impact resistance may be improved.

For example, the polymer coagulant may be in the form of latex. In this case, conjugated diene rubber latex may be uniformly enlarged, and formation of coagulum may be reduced.

For example, a method of preparing the polymer coagulant may include a step of adding 35 to 45 parts by weight of an alkyl acrylate compound, 0 to 10 parts by weight of a carboxylic acid-based compound, an emulsifier, and an initiator and performing primary polymerization; a step of adding 40 to 60 parts by weight of an alkyl acrylate compound, 5 to 15 parts by weight of a carboxylic acid-based compound, and an initiator when polymerization conversion rate is 85 to 93% after the primary polymerization step and performing secondary graft polymerization; and a step of terminating polymerization when polymerization conversion rate is 95 to 99% after the secondary graft polymerization. In this case, an excellent enlarging effect may be obtained, and the content of coagulum may be reduced.

Preferably, the method of preparing the polymer coagulant includes a step of adding 37 to 43 parts by weight of an alkyl acrylate compound, 0 to 5 parts by weight of a carboxylic acid-based compound, an emulsifier, and an initiator and performing primary polymerization; a step of adding 45 to 55 parts by weight of an alkyl acrylate compound, 7 to 12 parts by weight of a carboxylic acid-based compound, and an initiator when polymerization conversion rate is 85 to 93% after the primary polymerization step and performing secondary graft polymerization; a step of terminating polymerization when polymerization conversion rate is 95 to 99% after the secondary graft polymerization. In this case, an excellent enlarging effect may be obtained, and the content of coagulum may be reduced.

More Preferably, the method of preparing the polymer coagulant may include a step of adding 130 to 200 parts by weight of deionized water and 0.1 to 1 part by weight of an emulsifier to a nitrogen-substituted polymerization reactor, performing stirring while raising the internal temperature of the polymerization reactor to 65 to 75° C., and then adding 0.01 to 0.5 parts by weight of an initiator, 35 to 45 parts by weight of an alkyl acrylate compound, and 0 to 10 parts by weight of a carboxylic acid-based compound to perform primary polymerization; a step of continuously adding 40 to 60 parts by weight of an alkyl acrylate compound, 5 to 15 parts by weight of a carboxylic acid-based compound, and 1 to 5 parts by weight of an initiator at a constant rate when polymerization conversion rate is 85 to 93% (based on batch monomer conversion rate) after the primary polymerization step and performing secondary graft polymerization; and a step of terminating polymerization when polymerization conversion rate is 95 to 99% after the secondary graft polymerization. In this case, an excellent enlarging effect may be obtained, and the content of coagulum may be reduced.

For example, the alkyl acrylate compound of the present invention may include one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate, preferably one or more selected from the group consisting of methyl acrylate, ethyl acrylate, and butyl acrylate. In this case, latex stability and an excellent enlarging effect may be obtained, and fluidity and impact resistance may be improved.

For example, the carboxylic acid-based compound of the present invention may include one or more selected from the group consisting of acrylic acid, methacrylic acid, itaconic acid, crotonic acid, fumaric acid, and maleic acid, preferably methacrylic acid. In this case, an excellent enlarging effect may be obtained, and the content of coagulum may be reduced.

In this description, the emulsifier may include one or more selected from the group consisting of an alkyl sulfosuccinate metal salt having 12 to 18 carbon atoms or derivatives thereof, an alkyl sulfate ester having 12 to 20 carbon atoms or derivatives thereof, and an alkyl sulfonic acid metal salt having 12 to 20 carbon atoms or derivatives thereof.

For example, the alkyl sulfosuccinate metal salt having 12 to 18 carbon atoms or the derivatives thereof may include one or more selected from the group consisting of dicyclohexyl sulfosuccinate, dihexyl sulfosuccinate, di-2-ethyl hexyl sulfosuccinate sodium salt, di-2-ethyl hexyl sulfosuccinate potassium salt, dioctyl sulfosuccinate sodium salt, and dioctyl sulfosuccinate potassium salt.

For example, the alkyl sulfate ester having 12 to 20 carbon atoms or the derivatives thereof, and the alkyl sulfonic acid metal salt having 12 to 20 carbon atoms or derivatives thereof may include one or more selected from the group consisting of sodium lauryl sulfate, sodium dodecyl sulfate, sodium dodecyl benzene sulfate, sodium octadecyl sulfate, sodium oleic sulfate, potassium dodecyl sulfate, and potassium octadecyl sulfate.

In this description, the initiator may include one or more selected from the group consisting of sodium persulfate, potassium persulfate, ammonium persulfate, potassium superphosphate, hydrogen peroxide, t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, t-butyl peroxy isobutyrate, azobis isobutyronitrile, azobis-2,4-dimethylvaleronitrile, azobis cyclohexanecarbonitrile, and azobis isobutyric acid methyl, preferably potassium persulfate, t-butyl hydroperoxide, or mixtures thereof.

In this description, polymerization conversion rate may be measured by a measurement method commonly used in the art to which the present invention pertains. As a specific example, based on 100% of the total weight of monomers input until polymerization is completed, polymerization conversion rate may be defined as % by weight of the monomers converted into a polymer until measurement time. A method of measuring polymerization conversion rate is not particularly limited as long as the method follows this definition. As a specific example, after drying 1.5 g of prepared latex in a hot air dryer at 150° C. for 15 minutes, the weight of the dried latex is measured, and total solids content (TSC) is calculated by Equation 1 below. Then, polymerization conversion rate is calculated by substituting the total solids content value into Equation 2 below. In Equation 2, the total weight of added monomers is given as 100 parts by weight.

Total solids content (TSC; %)=(Weight after drying/Weight before drying)×100     [Equation 1]

Polymerization conversion rate (%)=[Total solids content (TSC)×(Total weight of added monomers,deionized water, and subsidiary raw materials)/100]−(Weight of added subsidiary raw materials other than monomers and deionized water)     [Equation 2]

In Equation 2, subsidiary raw materials include an initiator, an emulsifier, and a molecular weight modifier.

In the case of the polymer coagulant, the added monomers refer to an alkyl acrylate compound and a carboxylic acid-based compound. In the case of polymerization of conjugated diene rubber latex, the added monomer refers to a conjugated diene compound. In the case of polymerization of vinyl cyanide compound-conjugated diene rubber-aromatic vinyl compound graft copolymer latex, the added monomers refer to a conjugated diene compound, a vinyl cyanide compound, and an aromatic vinyl compound.

For example, in step (a), a polymer coagulant may be continuously added at a constant rate for 5 to 20 minutes while stirring medium-diameter conjugated diene rubber latex at 200 to 300 rpm, and then aging may be performed for 10 to 30 minutes. Preferably, in step (a), a polymer coagulant is continuously added at a constant rate for 7 to 17 minutes while stirring medium-diameter conjugated diene rubber latex at 220 to 270 rpm, and then aging is performed for 15 to 25 minutes. Within this range, uniform enlarging may be secured, and formation of coagulum may be reduced.

For example, step (a) may include a step of adding an adsorption-type emulsifier to large-diameter conjugated diene rubber latex to stabilize the large-diameter conjugated diene rubber latex. In this case, latex stability may be excellent, and coagulum may be reduced.

For example, in step (a), based on 100 parts by weight (based on solids) of the large-diameter conjugated diene rubber latex, the adsorption-type emulsifier may be added in an amount of 0.05 to 0.7 parts by weight, preferably 0.1 to 0.5 parts by weight. Within this range, latex stability may be excellent, and formation of coagulum may be reduced.

For example, the adsorption-type emulsifier may include one or more selected from alkyl aryl sulfonates, alkali methyl alkyl sulfates, sulfonated alkyl esters, fatty acid soap, oleic acid soap, and rosin acid alkali salts, preferably rosin acid alkali salts. In this case, latex stability may be excellent, and coagulum may be reduced.

For example, the medium-diameter conjugated diene rubber latex may be prepared by steps including a step of adding an emulsifier, an electrolyte, a molecular weight modifier, and an initiator to 60 to 80 parts by weight of 100 parts by weight of a conjugated diene compound and performing primary polymerization; a step of adding 20 to 40 parts by weight of the conjugated diene compound when polymerization conversion rate is 30 to 40% after the primary polymerization step and performing secondary polymerization; a step of adding an initiator and a molecular weight modifier when polymerization conversion rate is 55 to 65% after the secondary polymerization step and performing tertiary polymerization; a step of adding an initiator when polymerization conversion rate is 75 to 85% after the tertiary polymerization step and performing quaternary polymerization; and a step of terminating polymerization when polymerization conversion rate is 93 to 99% after the quaternary polymerization step. In this case, stable enlarging is possible within a short time by a polymer coagulant. In addition, by forming bimodal conjugated diene rubber latex with enlarged conjugated diene rubber latex, impact resistance and fluidity may be improved.

More preferably, the medium-diameter conjugated diene rubber latex may be prepared by steps including a step of adding 50 to 100 parts by weight of deionized water, 0.1 to 5 parts by weight of an adsorption-type emulsifier, 0.1 to 3 parts by weight of an electrolyte, 0.1 to 1 part by weight of a molecular weight modifier, and 0.1 to 3 parts by weight of an initiator to 60 to 80 parts by weight of 100 parts by weight of a conjugated diene compound placed in a polymerization reactor batchwise and then performing primary polymerization at 70 to 80° C.; a step of continuously adding 20 to 40 parts by weight of a conjugated diene compound for 3 to 7 hours when polymerization conversion rate is 30 to 40% after the primary polymerization step and then performing secondary polymerization; a step of adding 0.01 to 2 parts by weight of an initiator and 0.01 to 1 part by weight of a molecular weight modifier batchwise when polymerization conversion rate is 55 to 65% after the secondary polymerization step and then raising temperature by 4 to 10° C. to perform tertiary polymerization; a step of adding 0.01 to 3 parts by weight of a redox initiator when polymerization conversion rate is 75 to 85% after the tertiary polymerization step and then performing quaternary polymerization; and a step of terminating polymerization when polymerization conversion rate is 93 to 99% after the quaternary polymerization step. In this case, stable enlarging is possible within a short time by a polymer coagulant. In addition, by forming a bimodal conjugated diene rubber latex with enlarged conjugated diene rubber latex, impact resistance and fluidity may be improved.

For example, polymerization time for the medium-diameter conjugated diene rubber latex may be 15 to 20 hours, preferably 16 to 18 hours. In this case, latex having uniform particle diameter may be prepared.

For example, the emulsifier used to prepare the medium-diameter conjugated diene rubber latex may include one or more selected from the group consisting of allyl aryl sulfonates, alkali methyl alkyl sulfonates, sulfonated alkyl esters, fatty acid soap, and rosin acid alkali salts. In this case, polymerization stability may be excellent, and rubber latex having a desired particle diameter may be prepared.

For example, the electrolyte used to prepare the medium-diameter conjugated diene rubber latex may include one or more selected from the group consisting of KCl, NaCl, $KHCO_3$, $NaHCO_3$, $K_2CO_3$, $Na_2CO_3$, $KHSO_3$, $K_2SO_4$, $NaHSO_3$, $K_2P_2O_7$, $Na_2P_2O_7$, $K_3PO_4$, $Na_3PO_4$, and $K_2HPO_4$. In this case, latex stability may be excellent.

For example, the molecular weight modifier used to prepare the medium-diameter conjugated diene rubber latex may include one or more selected from the group consisting of t-dodecyl mercaptan, n-dodecyl mercaptan, n-octyl mercaptan, and carbon tetrachloride, preferably t-dodecyl mercaptan.

For example, the initiator used to prepare the medium-diameter conjugated diene rubber latex may include one or more selected from the group consisting of fat-soluble persulfates such as cumene hydroperoxide, diisopropyl benzene hydroperoxide, azobisisobutylnitrile, tert-butyl hydroperoxide, para-methane hydroperoxide, and benzoyl peroxide; peroxy monomers; and redox initiators. In this case, emulsion polymerization may be efficiently performed.

b) Step of Preparing Bimodal Conjugated Diene Rubber Latex

In step (b), the medium-diameter conjugated diene rubber latex is added to the prepared large-diameter conjugated diene rubber latex to prepare bimodal conjugated diene rubber latex.

In this description, the bimodal conjugated diene rubber latex means conjugated diene rubber latex obtained by mixing two or more types of conjugated diene rubber latex having different average particle diameters. As a specific example, the bimodal conjugated diene rubber latex is a mixture of large-diameter conjugated diene rubber latex and medium-diameter conjugated diene rubber latex. In this case, when particle size distribution is measured, a bimodal graph may be obtained.

Preferably, in step (b), 85 to 96% by weight (based on solids) of medium-diameter conjugated diene rubber latex is added to 4 to 15% by weight (based on solids) of large-diameter conjugated diene rubber latex to prepare bimodal conjugated diene rubber latex. More preferably, 87 to 94% by weight (based on solids) of medium-diameter conjugated diene rubber latex is added to 6 to 13% by weight (based on solids) of large-diameter conjugated diene rubber latex to prepare bimodal conjugated diene rubber latex. In this case, grafting efficiency may be excellent, and thus impact resistance and fluidity may be excellent.

For example, in step (b), the bimodal conjugated diene rubber latex may have an average particle diameter of 3,000 to 3,800 Å, preferably 3,100 to 3,700 Å, more preferably 3,200 to 3,600 Å, still more preferably 3,200 to 3,500 Å. Within this range, due to the presence of large-diameter conjugated diene rubber latex, grafting efficiency may be excellent, thereby improving impact resistance.

c) Step of Obtaining Graft Copolymer

In step (c), a vinyl cyanide compound-conjugated diene rubber-aromatic vinyl compound graft copolymer may be obtained by graft-polymerizing the prepared bimodal conjugated diene rubber latex, an aromatic vinyl compound, and a vinyl cyanide compound.

In step (c), preferably, 40 to 70% by weight (based on solids) of the prepared bimodal conjugated diene rubber latex, 15 to 45% by weight of an aromatic vinyl compound, and 5 to 25% by weight of a vinyl cyanide compound are graft-polymerized. More preferably, 55 to 65% by weight (based on solids) of the prepared bimodal conjugated diene rubber latex, 25 to 35% by weight of an aromatic vinyl compound, and 7 to 20% by weight of a vinyl cyanide compound are graft-polymerized. Still more preferably, 57 to 62% by weight (based on solids) of the prepared bimodal conjugated diene rubber latex, 27 to 32% by weight of an aromatic vinyl compound, and 7 to 15% by weight of a vinyl cyanide compound are graft-polymerized. In this case, grafting efficiency may be excellent, thereby improving impact resistance and fluidity.

For example, in step (c), during graft polymerization, an initiator may be added in an amount of 0.01 to 1 part by weight. Within this range, polymerization stability may be excellent, thereby improving polymerization efficiency.

For example, the initiator may include one or more selected from the group consisting of fat-soluble persulfates such as cumene hydroperoxide, diisopropyl benzene hydroperoxide, azobisisobutylnitrile, tert-butyl hydroperoxide, para-methane hydroperoxide, and benzoyl peroxide; peroxy monomers; and redox initiators. In this case, polymerization may be efficiently performed.

For example, the redox initiator may be a combination of a catalyst, an oxidizing agent, and a reducing agent. For example, the catalyst may be ferrous sulfate, the oxidizing agent may include one or more selected from the group consisting of ammonium persulfate, potassium persulfate, hydrogen peroxide, t-butyl hydroperoxide, benzoyl peroxide, cumene hydroperoxide, and p-menthane hydroperoxide, and the reducing agent may include one or more selected from the group consisting of sodium sulfite, acid sodium sulfite, rongalite, dextrose, sodium pyrophosphate, and ascorbic acid.

The redox initiator is preferably a mixture of ferrous sulfate, t-butyl hydroperoxide, dextrose, and sodium pyrophosphate. In this case, since radicals are generated faster than a thermal initiator such as potassium persulfate, polymerization reaction rate may be increased, thereby reducing polymerization time.

For example, the graft copolymer obtained in step (c) may be in the form of latex. Step (c) may include a step of coagulating the graft copolymer. Preferably, step (c) includes coagulation, aging, dehydration, and drying steps. A graft copolymer prepared by the steps may be provided in the form of powder. As the coagulation, aging, dehydration, and drying steps, methods commonly used in the art may be used without particular limitation.

For example, in the method of preparing the graft copolymer, the coagulation step may be a step of adding an acid coagulant, such as sulfuric acid, phosphoric acid, and hydrochloric acid, or a salt coagulant, such as magnesium sulfate, aluminum sulfate, and calcium chloride, alone or in combination.

In the method of preparing the graft copolymer, other reaction conditions, such as reaction time, reaction temperature, pressure, and time of input of reactants, other than the above-mentioned conditions, may be appropriately selected and used without particular limitation as long as the other reaction conditions are commonly used in the art to which the present invention pertains.

In this description, the conjugated diene compound may include one or more selected from the group consisting of 1,3-butadiene, 2,3-dimethyl-1,3-butadiene, 2-ethyl-1,3-butadiene, 1,3-pentadiene, isoprene, chloroprene, and piperylene.

In this description, the aromatic vinyl monomer may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene.

In this description, the vinyl cyanide compound may be acrylonitrile, methacrylonitrile, or a mixture thereof.

Method of Preparing Thermoplastic Resin Composition

A method of preparing a thermoplastic resin composition according to the present invention may include a step of preparing a vinyl cyanide compound-conjugated diene rubber-aromatic vinyl compound graft copolymer according to the above preparation method; and a step of feeding 15 to 40% by weight of the prepared graft copolymer and 60 to 85% by weight of an aromatic vinyl compound-vinyl cyanide compound copolymer into an extruder, performing melt-kneading, and performing extrusion. In this case, the grafting efficiency of a graft copolymer may be excellent, and thus impact resistance and fluidity may be excellent.

In the method of preparing a thermoplastic resin composition, 20 to 35% by weight of a graft copolymer and 65 to 80% by weight of an aromatic vinyl compound-vinyl cyanide compound copolymer are preferably included. More preferably, 25 to 30% by weight of a graft copolymer and 70 to 75% by weight of an aromatic vinyl compound-vinyl cyanide compound copolymer are included. In this case, impact resistance and fluidity may be excellent.

For example, the aromatic vinyl compound-vinyl cyanide compound copolymer may be a copolymer obtained by polymerizing 60 to 95% by weight, preferably 65 to 90% by weight, more preferably 70 to 85% by weight of an aromatic vinyl compound and 5 to 40% by weight, preferably 10 to 35% by weight, more preferably 15 to 30% by weight of a vinyl cyanide compound.

For example, the melt-kneading may be performed at 200 to 280° C., preferably 220 to 260° C.

For example, the melt-kneading may be performed using a Banbury mixer, a single-screw extruder, a twin-screw extruder, a kneader or the like, without particular limitation.

When the melt-kneading is performed, when necessary, one or more additives selected from the group consisting of a colorant, a heat stabilizer, a light stabilizer, a reinforcing agent, a filler, a flame retardant, a lubricant, a plasticizer, an antistatic agent, and a processing aid may be added.

In describing the method of preparing a thermoplastic resin composition, repeated description of the method of preparing the graft copolymer is omitted.

Thermoplastic Resin Composition

A thermoplastic resin composition of the present invention includes 15 to 40% by weight of a graft copolymer including bimodal conjugated diene rubber, an aromatic vinyl compound, and a vinyl cyanide compound and 60 to 85% by weight of an aromatic vinyl compound-vinyl cyanide compound copolymer. The bimodal conjugated diene rubber includes, based on a total weight thereof, 85 to 97% by weight of conjugated diene rubber having an average particle diameter of 2,400 to 2,800 Å, 1 to 14% by weight of conjugated diene rubber having an average particle diameter of 5,800 to 8,500 Å, and 0.1 to 2% by weight of a polymer coagulant. The thermoplastic resin composition has an Izod impact strength of 32 kgf·cm/cm or more as measured using a specimen having a thickness of ¼" according to ASTM D256. In this case, physical property balance and fluidity may be excellent.

Preferably, the bimodal conjugated diene rubber includes, based on a total weight thereof, 88 to 95% by weight of conjugated diene rubber having an average particle diameter of 2,400 to 2,800 Å, 4 to 11% by weight of conjugated diene rubber having an average particle diameter of 5,800 to 8,500 Å, and 0.2 to 1.5% by weight of a polymer coagulant. Within this range, due to the presence of the conjugated diene rubber having an average particle diameter of 5,800 to 8,500 Å, grafting efficiency and impact resistance may be improved.

For example, the polymer coagulant may have an average particle diameter of 700 to 1,700 Å, preferably 900 to 1,600 Å, more preferably 1,000 to 1,500 Å, still more preferably 1,100 to 1,400 Å. Within this range, impact resistance and fluidity may be excellent.

For example, the bimodal conjugated diene rubber may have an average particle diameter of 3,000 to 3,800 Å, preferably 3,100 to 3,700 Å, more preferably 3,200 to 3,600 Å. Within this range, impact resistance may be improved.

For example, the graft copolymer may have a grafting degree of 30 to 45%, preferably 30 to 37%. Within this range, impact resistance and fluidity may be excellent.

In this description, a certain amount of a graft copolymer is immersed in acetone, dissolved using a vibrator, centrifuged using a centrifuge, and dried to obtain insoluble matter. Then, grafting degree may be calculated using Equation 3 below.

Specifically, 2 g of dried graft copolymer powder is immersed in 100 ml of acetone, vibrated using a vibrator (trade name: SI-600R, manufacturer: Lab Companion) for 24 hours to dissolve the isolated graft copolymer, centrifuged at 14,000 rpm for 1 hour using a centrifuge, and dried at 140° C. for 2 hours using a vacuum dryer (trade name: DRV320DB, manufacturer: ADVANTEC) to obtain insoluble matter. Then, grafting degree is calculated by Equation 3 below.

$$\text{Grafting degree (\%)} = [\text{Weight of grafted monomers (g)/Rubber weight (g)}] \times 100 \quad \text{[Equation 3]}$$

(In Equation 3, the weight of grafted monomers (g) is obtained by subtracting rubber weight (g) from the weight of insoluble substances (gel) obtained by dissolving a graft copolymer in acetone and performing centrifugation, and the rubber weight (g) is the weight (g) of rubber components theoretically added to graft copolymer powder.)

The thermoplastic resin composition preferably has an Izod impact strength of 32 kgf·cm/cm or more, more preferably 33 to 37 kgf·cm/cm. In this case, physical property balance and fluidity may be excellent.

For example, the thermoplastic resin composition may have a melt index of 20 g/10 min or more, more preferably 21 g/10 min or more, still more preferably 21 to 28 g/10 min as measured under conditions of 220° C. and 10 kg according to ASTM D1238. Within this range, due to excellent fluidity, various shapes may be realized by molding.

Hereinafter, the present invention will be described with reference to the following drawings.

FIG. 1 below is a TEM image of a large-diameter rubber polymer enlarged using a polymer coagulant according to Preparation Example C1 of the present invention. Referring to FIG. 1, rubber polymer is agglomerated around the polymer coagulant to form a large mass, and a somewhat irregularly shaped edge is observed.

In addition, FIG. 2 below is a TEM image of a large-diameter rubber polymer polymerized by direct polymerization according to Preparation Example C6. Referring to FIG. 2, spherical shapes are observed separately, showing a non-agglomerated shape.

In addition, FIG. 3 below is a TEM image of a large-diameter rubber polymer enlarged using acetic acid according to Preparation Example C7. Referring to FIG. 3, small spherical particles aggregate together to form large and small clumps. At the edge of the clumps, small circles overlap.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Preparation Example A: Preparation of Polymer Coagulant 160 parts by weight of deionized water and 0.5 parts by weight of sodium dioctyl sulfosuccinate as an emulsifier were fed into a nitrogen-substituted polymerization reactor, and stirring was performed while raising the internal temperature of the polymerization reactor to 70° C. Then, 0.1 parts by weight of potassium persulfate as an initiator and parts by weight of butyl acrylate were fed, and polymerization was performed for 90 minutes. When polymerization conversion rate reached 90% (based on batch monomer conversion rate), 50 parts by weight of butyl acrylate, 10 parts by weight of methacrylic acid, and 3.0 parts by weight of an aqueous potassium persulfate solution (concentration: 3% by weight) as an initiator were continuously fed at a constant rate to perform graft polymerization. When polymerization conversion rate reached 98%, polymerization was terminated. At this time, the obtained polymer coagulant had a core-shell structure and an average particle diameter of 1,300 Å.

Preparation Example B1: Preparation of Medium-Diameter Conjugated Diene Rubber Latex 70 parts by weight of deionized water, 70 parts by weight of 1,3-butadiene as a monomer, 1 part by weight of rosin acid potassium salt and 0.8 parts by weight of fatty acid soap as emulsifiers, 1 part by weight of potassium carbonate as an electrolyte, 0.3 parts by weight of tert-dodecyl mercaptan (TDDM) as a molecular weight modifier, and 0.3 parts by weight of potassium persulfate ($K_2S_2O_8$) as an initiator were fed into a nitrogen-substituted polymerization reactor (autoclave) batchwise, and polymerization was performed at a reaction temperature of 74° C. Then, when polymerization conversion rate reached 30 to 40%, 30 parts by weight of the remaining 1,3-butadiene was continuously fed for 5 hours. Then, when polymerization conversion rate reached 60%, 0.15 parts by weight of potassium persulfate and 0.1 parts by weight of tert-dodecyl mercaptan (TDDM) were fed batchwise, and temperature was raised to 80° C. to perform polymerization. Then, when polymerization conversion rate reached 80%, 0.03 parts by weight of t-butyl hydroperoxide, 0.054 parts by weight of dextrose, 0.04 parts by weight of sodium pyrophosphate, and 0.002 parts by weight of ferrous sulfate were fed. Then, when polymerization conversion rate reached 95%, polymerization was terminated to obtain conjugated diene rubber latex having an average particle diameter of 2,700 Å. At this time, polymerization time was 17 hours.

Preparation Example B2: Preparation of Medium-Diameter Conjugated Diene Rubber Latex 70 parts by weight of deionized water, 70 parts by weight of 1,3-butadiene as a monomer, 1 part by weight of rosin acid potassium salt and 0.8 parts by weight of fatty acid soap as emulsifiers, 0.9 parts by weight of potassium carbonate as an electrolyte, 0.3 parts by weight of tert-dodecyl mercaptan (TDDM) as a molecular weight modifier, and 0.3 parts by weight of potassium persulfate ($K_2S_2O_8$) as an initiator were fed into a nitrogen-substituted polymerization reactor (autoclave) batchwise, and polymerization was performed at a reaction temperature of 74° C. Then, when polymerization conversion rate reached 30 to 40%, 30 parts by weight of the remaining 1,3-butadiene was continuously fed for 5 hours. Then, when polymerization conversion rate reached 60%, 0.15 parts by weight of potassium persulfate and 0.1 parts by weight of tert-dodecyl mercaptan (TDDM) were fed batchwise, and temperature was raised to 80° C. to perform polymerization. Then, when polymerization conversion rate reached 80%, 0.03 parts by weight of t-butyl hydroperoxide, 0.054 parts by weight of dextrose, 0.04 parts by weight of sodium pyrophosphate, and 0.002 parts by weight of ferrous sulfate were fed. Then, when polymerization conversion rate reached 95%, polymerization was terminated to obtain conjugated diene rubber latex having an average particle diameter of 2,600 Å. At this time, polymerization time was 16 hours.

Preparation Example B3: Preparation of Medium-Diameter Conjugated Diene Rubber Latex 70 parts by weight of deionized water, 70 parts by weight of 1,3-butadiene as a monomer, 1 part by weight of rosin acid potassium salt and 0.9 parts by weight of fatty acid soap as emulsifiers, 0.85 parts by weight of potassium carbonate as an electrolyte, 0.3 parts by weight of tert-dodecyl mercaptan (TDDM) as a molecular weight modifier, and 0.3 parts by weight of potassium persulfate ($K_2S_2O_8$) as an initiator were fed into a nitrogen-substituted polymerization reactor (autoclave) batchwise, and polymerization was performed at a reaction temperature of 74° C. Then, when polymerization conversion rate reached 30 to 40%, 30 parts by weight of the remaining 1,3-butadiene was continuously fed for 5 hours. Then, when polymerization conversion rate reached 60%, 0.15 parts by weight of potassium persulfate and 0.1 parts by weight of tert-dodecyl mercaptan (TDDM) were fed batchwise, and temperature was raised to 80° C. to perform polymerization. Then, when polymerization conversion rate reached 80%, 0.03 parts by weight of t-butyl hydroperoxide, 0.054 parts by weight of dextrose, 0.04 parts by weight of sodium pyrophosphate, and 0.002 parts by weight of ferrous sulfate were fed. Then, when polymerization conversion rate reached 95%, polymerization was terminated to obtain conjugated diene rubber latex having an average particle diameter of 2,500 Å. At this time, polymerization time was 15 hours.

Preparation Example B4: Preparation of Small-Diameter Conjugated Diene Rubber Latex 130 parts by weight of deionized water, 80 parts by weight of 1,3-butadiene as a monomer, 2.5 parts by weight of fatty acid soap as an emulsifier, 0.3 parts by weight of potassium carbonate as an electrolyte, 0.3 parts by weight of tert-dodecyl mercaptan (TDDM) as a molecular weight modifier, 0.03 parts by weight of t-butyl hydroperoxide, 0.054 parts by weight of dextrose, 0.04 parts by weight of sodium pyrophosphate, and 0.002 parts by weight of ferrous sulfate were fed into a nitrogen-substituted polymerization reactor (autoclave) batchwise, and polymerization was performed at a reaction temperature of 60° C. Then, when polymerization conversion rate reached 40%, 20 parts by weight of the remaining 1,3-butadiene was continuously fed for 5 hours. Then, when polymerization conversion rate reached 60%, 0.15 parts by weight of potassium persulfate and 0.1 parts by weight of tert-dodecyl mercaptan (TDDM) were fed batchwise, and temperature was raised to 80° C. to perform polymerization. Then, when polymerization conversion rate reached 95%, polymerization was terminated to obtain conjugated diene rubber latex having an average particle diameter of 1,200 Å. At this time, polymerization time was 13 hours.

Preparation Example C1: Preparation of Large-Diameter Conjugated Diene Rubber Latex 0.5 parts by weight (based on solids) of the polymer coagulant prepared in Preparation Example A was continuously fed at a constant rate for 7 minutes while stirring, at 250 rpm, 100 parts by weight (based on solids) of the medium-diameter rubber latex having an average particle diameter of 2,700 Å prepared in Preparation Example B1, and stirring was performed for 30 minutes to enlarge the medium-diameter rubber latex. Then, 0.2 parts by weight of rosin acid potassium salt was added for stabilization, and large-diameter rubber latex (C1) having an average particle diameter 6,100 Å was obtained.

Preparation Example C2: Preparation of Large-Diameter Conjugated Diene Rubber Latex 0.7 parts by weight (based on solids) of the polymer coagulant prepared in Preparation Example A was continuously fed at a constant rate for 10 minutes while stirring, at 250 rpm, 100 parts by weight (based on solids) of the medium-diameter rubber latex having an average particle diameter of 2,700 Å prepared in Preparation Example B1, and stirring was performed for 20 minutes to enlarge the medium-diameter rubber latex. Then, 0.2 parts by weight of rosin acid potassium salt was added for stabilization, and large-diameter rubber latex (C2) having an average particle diameter 7,000 Å was obtained.

Preparation Example C3: Preparation of Large-Diameter Conjugated Diene Rubber Latex 0.9 parts by weight (based on solids) of the polymer coagulant prepared in Preparation Example A was continuously fed at a constant rate for 10 minutes while stirring, at 250 rpm, 100 parts by weight (based on solids) of the medium-diameter rubber latex having an average particle diameter of 2,700 Å prepared in Preparation Example B1, and stirring was performed for 20 minutes to enlarge the medium-diameter rubber latex. Then, 0.2 parts by weight of rosin acid potassium salt was added for stabilization, and large-diameter rubber latex (C3) having an average particle diameter of 7,900 Å was obtained.

Preparation Example C4: Preparation of Large-Diameter Conjugated Diene Rubber Latex 1.2 parts by weight (based on solids) of the polymer coagulant prepared in Preparation Example A was continuously fed at a constant rate for 10 minutes while stirring, at 250 rpm, 100 parts by weight (based on solids) of the medium-diameter rubber latex having an average particle diameter of 2,600 Å prepared in Preparation Example B2, and stirring was performed for 20 minutes to enlarge the medium-diameter rubber latex. Then, 0.2 parts by weight of rosin acid potassium salt was added for stabilization, and large-diameter rubber latex (C4) having an average particle diameter 8,000 Å was obtained.

Preparation Example C5: Preparation of Large-Diameter Conjugated Diene Rubber Latex 1.5 parts by weight (based on solids) of the polymer coagulant prepared in Preparation Example A was continuously fed at a constant rate for 10 minutes while stirring, at 250 rpm, 100 parts by weight (based on solids) of the medium-diameter rubber latex having an average particle diameter of 2,500 Å prepared in Preparation Example B3, and stirring was performed for 20 minutes to enlarge the medium-diameter rubber latex. Then, 0.2 parts by weight of rosin acid potassium salt was added for stabilization, and large-diameter rubber latex (C5) having an average particle diameter 8,200 Å was obtained.

Preparation Example C6: Preparation of Large-Diameter Conjugated Diene Rubber Latex: Direct Polymerization 70 parts by weight of deionized water, 70 parts by weight of 1,3-butadiene as a monomer, 1 part by weight of rosin acid potassium salt and 0.8 parts by weight of fatty acid soap as emulsifiers, 1.4 parts by weight of potassium carbonate as an electrolyte, 0.3 parts by weight of tert-dodecyl mercaptan (TDDM) as a molecular weight modifier, and 0.3 parts by weight of potassium persulfate ($K_2S_2O_8$) as an initiator were fed into a nitrogen-substituted polymerization reactor (autoclave) batchwise, and polymerization was performed at a reaction temperature of 74° C. Then, when polymerization conversion rate reached 30 to 40%, 30 parts by weight of the remaining 1,3-butadiene was continuously fed for 5 hours. Then, when polymerization conversion rate reached 60%, 0.15 parts by weight of potassium persulfate and 0.1 parts by weight of tert-dodecyl mercaptan (TDDM) were fed batchwise, and temperature was raised to 80° C. to perform polymerization. Then, when polymerization conversion rate reached 80%, 0.03 parts by weight of t-butyl hydroperoxide, 0.054 parts by weight of dextrose, 0.04 parts by weight of sodium pyrophosphate, and 0.002 parts by weight of ferrous sulfate were fed. Then, when polymerization conversion rate reached 93%, polymerization was terminated to obtain a rubber polymer having an average particle diameter of 3,300 Å. At this time, polymerization time was 32 hours.

Preparation Example C7: Preparation of Large-Diameter Conjugated Diene Rubber Latex—Acetic Acid Enlarging 100 parts by weight (based on solids) of small-diameter rubber latex having an average particle diameter of 1,200 Å prepared in Preparation Example B4 was fed into another reaction tank, and stirring speed was adjusted to 60 rpm. Then, stirring was performed while slowly adding 2.0 parts by weight of an aqueous acetic acid solution having a concentration of 5% by weight for 30 minutes. Then, to perform an acid treatment process for stabilization, stirring was performed while adding 1.9 parts by weight of an aqueous KOH solution having a concentration of 7% by weight for 30 minutes. Through the above processes, a rubber polymer (C7) having an average particle diameter of 3,450 Å was obtained.

Preparation Example C8: Preparation of
Large-Diameter Conjugated Diene Rubber Latex 0.1 parts by weight (based on solids) of the polymer coagulant prepared in Preparation Example A was continuously fed at a constant rate for 10 minutes while stirring, at 250 rpm, 100 parts by weight (based on solids) of the medium-diameter rubber latex having an average particle diameter of 2,700 Å prepared in Preparation Example B1, and stirring was performed for 20 minutes to enlarge the medium-diameter rubber latex. Then, 0.2 parts by weight of rosin acid potassium salt was added for stabilization, and large-diameter rubber latex (C8) having an average particle diameter of 3,000 Å was obtained.

Preparation Example C9: Preparation of
Large-Diameter Conjugated Diene Rubber Latex 1.7 parts by weight (based on solids) of the polymer coagulant prepared in Preparation Example A was continuously fed at a constant rate for 10 minutes while stirring, at 250 rpm, 100 parts by weight (based on solids) of the medium-diameter rubber latex prepared in Preparation Example B1, and stirring was performed for 20 minutes to enlarge the medium-diameter rubber latex. Then, 0.2 parts by weight of rosin acid potassium salt was added for stabilization, and large-diameter rubber latex (C9) having an average particle diameter of 9,000 Å was obtained.

Preparation Example C10: Preparation of
Medium-Diameter Conjugated Diene Rubber Latex
by Enlarging Small-Diameter Conjugated Diene
Rubber Latex Using Polymer Coagulant 0.7 parts by weight (based on solids) of the polymer coagulant prepared in Preparation Example A was continuously fed at a constant rate for 10 minutes while stirring, at 250 rpm, 100 parts by weight (based on solids) of small-diameter conjugated diene rubber latex having an average particle diameter of 1,200 Å prepared in Preparation Example B4, and stirring was performed for 20 minutes to enlarge the small-diameter conjugated diene rubber latex. Then, 0.2 parts by weight of rosin acid potassium salt was added for stabilization, and medium-diameter rubber latex (C10) having an average particle diameter of 2,800 Å was obtained.

Preparation Example C11: Preparation of
Large-Diameter Conjugated Diene Rubber
Latex—Acetic Acid Enlarging 100 parts by weight (based on solids) of medium-diameter rubber latex having an average particle diameter of 2,700 Å prepared in Preparation Example B1 was fed into another reaction tank, and stirring speed was adjusted to 60 rpm. Then, stirring was performed while slowly adding 2.0 parts by weight of an aqueous acetic acid solution having a concentration of 5% by weight for 30 minutes. Then, to perform an acid treatment process for stabilization, stirring was performed while adding 1.9 parts by weight of an aqueous KOH solution having a concentration of 7% by weight for 30 minutes. Through the above processes, a rubber polymer (C11) having an average particle diameter of 6,100 Å was obtained.

Example 1

<Preparation of Graft Copolymer>
55 parts by weight (based on solids) of the medium-diameter rubber polymer (B1) prepared in Preparation Example B1, 5 parts by weight of the large-diameter rubber polymer (C1) prepared in Preparation Example C1, 90 parts by weight of deionized water, 1.0 part by weight of potassium oleic as a fatty acid salt, 7.5 parts by weight of styrene as a monomer, and 2.5 parts by weight of acrylonitrile were fed, and then the temperature of a reactor was maintained at 50° C. Then, 0.05 parts by weight of cumene hydroperoxide, 0.09 parts by weight of sodium pyrophosphate, 0.12 parts by weight of dextrose, and 0.015 parts by weight of ferrous sulfate were fed batchwise to initiate reaction. Simultaneously with the start of polymerization, temperature was raised to 75° C. while continuously feeding a mixed solution containing 22.5 parts by weight of styrene, 7.5 parts by weight of acrylonitrile, 0.3 parts by weight of tert-dodecylmercaptan, and 0.12 parts by weight of cumene hydroperoxide into the reactor for 2 hours. After feeding, 0.06 parts by weight of cumene hydroperoxide, 0.04 parts by weight of sodium pyrophosphate, 0.06 parts by weight of dextrose, and 0.001 parts by weight of ferrous sulfate were fed, and temperature was raised to 80° C. Then, when polymerization conversion rate reached 98%, reaction was terminated. Then, 0.1 parts by weight of silicone oil and 0.5 parts by weight of an antioxidant emulsion (Winstay-L/IR1076=0.8/0.2) were added to 100 parts by weight (based on solids) of the latex obtained by the reaction, and then an aqueous magnesium sulfate solution was added for coagulation. Then, dehydration, washing, and drying were performed to obtain graft copolymer powder.

<Preparation of Thermoplastic Resin Composition>
27 parts by weight of the prepared graft copolymer powder, 73 parts by weight of a SAN resin (92HR, LG Chemical Co.), and 1.2 parts by weight of a lubricant were fed into a mixer and mixed. Then, a resin composition in the form of pellets was prepared at 210° C. using an extruder, and the resin composition was injected under conditions of 210° C. and 550 bar to obtain a specimen for measuring physical properties.

Example 2

The same procedure as in Example 1 was performed, except that the large-diameter rubber latex (C1) was replaced with the product prepared in Preparation Example C2.

Example 3

The same procedure as in Example 1 was performed, except that the large-diameter rubber latex (C1) was replaced with the product prepared in Preparation Example C3.

Example 4

The same procedure as in Example 1 was performed, except that the medium-diameter rubber latex (B1) and the large-diameter rubber latex (C1) were replaced with the medium-diameter rubber polymer (B2) prepared in Preparation Example B2 and the large-diameter rubber polymer (C4) prepared in Preparation Example C4, respectively.

Example 5

The same procedure as in Example 1 was performed, except that the medium-diameter rubber latex (B1) and the large-diameter rubber latex (C1) were replaced with the medium-diameter rubber polymer (B3) prepared in Preparation Example B3 and the large-diameter rubber polymer (C5) prepared in Preparation Example C5, respectively.

Comparative Example 1

The same procedure as in Example 1 was performed, except that the medium-diameter rubber latex (B1) and the large-diameter rubber latex (C1) were replaced with the products prepared in Preparation Example C6.

Comparative Example 2

The same procedure as in Example 1 was performed, except that the medium-diameter rubber latex (B1) and the large-diameter rubber latex (C1) were replaced with the small-diameter rubber latex (B4) prepared in Preparation Example B4 and the large-diameter rubber latex (C7) prepared in Preparation Example C7, respectively.

Comparative Example 3

The same procedure as in Example 1 was performed, except that the large-diameter rubber latex (C1) was replaced with the product prepared in Preparation Example C8.

Comparative Example 4

The same procedure as in Example 1 was performed, except that the large-diameter rubber latex (C1) was replaced with the product prepared in Preparation Example C9.

Comparative Example 5

The same procedure as in Example 1 was performed, except that the medium-diameter rubber latex (B1) and the large-diameter rubber latex (C1) were replaced with the small-diameter rubber latex (B4) prepared in Preparation Example B4 and the medium-diameter rubber latex (C10) prepared in Preparation Example C10, respectively.

Comparative Example 6

The same procedure as in Example 1 was performed, except that the large-diameter rubber latex (C1) was replaced with the large-diameter rubber latex (C11) prepared in Preparation Example C11.

Test Examples

The properties of the specimens prepared in Examples 1 to 5 and Comparative Examples 1 to 6 were measured according to the following methods, and the results are shown in Tables 1 and 2 below.

Measurement Methods

Measurement of average particle diameter (Å): The average particle diameters of the small-diameter rubber polymers, the medium-diameter rubber polymers, the large-diameter rubber polymers, and the bimodal rubber polymers were measured using a particle size analyzer (NICOMP 380 HPL)

Grafting degree (%): 2 g of graft copolymer powder was added to 100 ml of acetone, vibrated with a vibrator (trade name: SI-600R, manufacturer: Lab Companion) for 24 hours to dissolve the isolated graft copolymer, centrifuged at 14,000 rpm for 1 hour using a centrifuge, and dried at 140° C. for 2 hours using a vacuum dryer (trade name: DRV320DB, manufacturer: ADVANTEC) to obtain insoluble matter. Then, grafting degree is calculated by Equation 3 below.

$$\text{Grafting degree (\%)} = [\text{Weight of grafted monomers (g)/Rubber weight (g)}] \times 100 \qquad [\text{Equation 3}]$$

(In Equation 3, the weight of grafted monomers (g) is obtained by subtracting rubber weight (g) from the weight of insoluble substances (gel) obtained by dissolving a graft copolymer in acetone and performing centrifugation, and the rubber weight (g) is the weight (g) of rubber components theoretically added to the graft copolymer powder.)

Izod impact strength (kgf·cm/cm): Izod impact strength was measured using a specimen having a thickness of ¼" according to ASTM D256.

Melt index (MI; g/10 min): Melt index was measured under conditions of 220° C. and 10 kg according to ASTM D1238.

TABLE 1

| Classification | | Example 1 | Example 2 | Example 3 | Example 4 | Example 5 |
|---|---|---|---|---|---|---|
| Rubber polymer | Medium-diameter rubber polymer Polymerization time (HR) | 17 | 17 | 17 | 16 | 15 |
| | Medium-diameter rubber polymer Average particle diameter (Å) | 2700 (Preparation Example B1) | 2700 (Preparation Example B1) | 2700 (Preparation Example B1 | 2600 (Preparation Example B2) | 2500 (Preparation Example B3) |
| | Polymer coagulant (parts by weight) | 0.5 | 0.7 | 0.9 | 1.2 | 1.5 |

TABLE 1-continued

| Classification | | Example 1 | Example 2 | Example 3 | Example 4 | Example 5 |
|---|---|---|---|---|---|---|
| Graft copolymer | Large-diameter rubber polymer Average particle diameter (Å) | 6100 (Preparation Example C1) | 7000 (Preparation Example C2) | 7900 (Preparation Example C3) | 8000 (Preparation Example C4) | 8200 (Preparation Example C5) |
| | Bimodal rubber polymer Average particle diameter (Å) | 3210 | 3460 | 3570 | 3600 | 3420 |
| | Grafting degree (%) | 37 | 32 | 30 | 30 | 36 |
| Thermoplastic resin composition | Impact strength | 33 | 34 | 36 | 32 | 34 |
| | Melt index | 22 | 23 | 20 | 23 | 21 |

TABLE 2

| Classification | | Comparative Example 1 | Comparative Example 2 | Comparative Example 3 | Comparative Example 4 | Comparative Example 5 | Comparative Example 6 |
|---|---|---|---|---|---|---|---|
| Rubber polymer | Medium-diameter rubber polymer Polymerization time (HR) | 32* | 13 | 17 | 17 | 13 | 17 |
| | Medium-diameter rubber polymer Average particle diameter (Å) | — | 1200 (Preparation Example B4) | 2700 (Preparation Example B1) | 2700 (Preparation Example B1) | 1200 (Preparation Example B4) | 2700 (Preparation Example B1) |
| | Polymer coagulant (parts by weight) | Direct polymerization | Acetic acid coagulation | 0.1 | 1.7 | 0.7 | Acetic acid coagulation |
| | Large-diameter rubber polymer Average particle diameter (Å) | 3300 (Preparation Example C6) | 3450 (Preparation Example C7) | 3000 (Preparation Example C8) | 9000 (Preparation Example C9) | 2800 (Preparation Example C10) | 6100 (Preparation Example C11) |
| Graft copolymer | Bimodal rubber polymer Average particle diameter (Å) | 3300 | 3450 | 2900 | 3800 | 2700 | 3200 |
| | Grafting degree (%) | 47 | 29 | 39 | 27 | 49 | 32 |
| Thermoplastic resin composition | Impact strength | 30 | 30 | 29 | 31 | 23 | 28 |
| | Melt index | 18 | 20 | 17 | 20 | 16 | 17 |

In Comparative Example 1, * indicates time required for polymerization of a large-diameter rubber polymer.

As shown in Tables 1 and 2, compared to Comparative Examples 1 to 6, in the case of Examples 1 to 5 including the bimodal conjugated diene rubber according to the present invention, time for preparing large-diameter conjugated diene rubber is significantly reduced. In addition, due to excellent grafting degree, impact strength and fluidity are improved.

Specifically, in the case of Comparative Example 1 in which large-diameter conjugated diene rubber was prepared by direct polymerization, polymerization time was 32 hours, but production efficiency was reduced. In the case of Comparative Example 2 in which the small-diameter conjugated diene rubber (Preparation Example B4) having an average particle diameter of 1,200 Å was coagulated using acetic acid, grafting degree and impact strength were reduced.

In addition, in the case of Comparative Example 3 in which enlarging was performed using 0.1 parts by weight of the polymer coagulant, the average particle diameter of the enlarged conjugated diene rubber was only 3,000 Å, showing a very small particle size. In the case of Comparative Example 4 in which enlarging was performed using 1.7 parts by weight of the polymer coagulant, the average particle diameter of the enlarged conjugated diene rubber was 9,000 Å, showing a very large particle size. In addition, grafting degree and impact strength were reduced.

In addition, in the case of Comparative Example 5 in which enlarging of the small-diameter conjugated diene rubber (Preparation Example B4) having an average particle diameter of 1,200 Å was performed using the polymer coagulant, average particle diameter was 2,800 Å, showing a very small particle size. In addition, due to low grafting degree, impact strength and fluidity were reduced.

In conclusion, according to the method of preparing a vinyl cyanide compound-conjugated diene rubber-aromatic vinyl compound graft copolymer of the present invention, enlarged conjugated diene rubber latex is prepared by enlarging conjugated diene rubber latex using a polymer coagulant. Then, the enlarged conjugated diene rubber latex is added to non-enlarged conjugated diene rubber latex in a predetermined content to prepare bimodal conjugated diene rubber latex. With this method, time for preparing the enlarged conjugated diene rubber is significantly reduced. In addition, due to high grafting efficiency, impact resistance and fluidity are improved, demonstrating a synergistic effect.

The invention claimed is:

1. A method of preparing a vinyl cyanide compound-conjugated diene rubber-aromatic vinyl compound graft copolymer, comprising:
   step (a) comprising adding a polymer coagulant to a medium-diameter conjugated diene rubber latex having an average particle diameter of 2,400 to 2,800 Å to enlarge the medium-diameter conjugated diene rubber latex to prepare a large-diameter conjugated diene rubber latex having an average particle diameter of 5,800 to 8,500 Å;
   step (b) comprising adding a medium-diameter conjugated diene rubber latex having an average particle diameter of 2,400 to 2,800 Å to the prepared large-diameter conjugated diene rubber latex to prepare a bimodal conjugated diene rubber latex; and
   step (c) comprising graft-polymerizing the prepared bimodal conjugated diene rubber latex, an aromatic vinyl compound, and a vinyl cyanide compound to obtain a vinyl cyanide compound-conjugated diene rubber-aromatic vinyl compound graft copolymer.

2. The method according to claim 1, wherein, in step (a), the polymer coagulant is added in an amount of 0.3 to 1.5 parts by weight of solids based on 100 parts by weight of solids of the medium-diameter conjugated diene rubber latex.

3. The method according to claim 1, wherein the polymer coagulant has an average particle diameter of 700 to 1,700 Å.

4. The method according to claim 1, wherein the polymer coagulant is a graft copolymer prepared by graft-polymerizing an alkyl acrylate compound and a carboxylic acid-based compound onto a core obtained by polymerizing one or more selected from the group consisting of alkyl acrylate compounds and carboxylic acid-based compounds.

5. The method according to claim 1, wherein, in step (a), the polymer coagulant is continuously added at a constant rate for 5 to 20 minutes while stirring the medium-diameter conjugated diene rubber latex at 200 to 300 rpm, and aging is performed for 10 to 30 minutes.

6. The method according to claim 1, wherein step (a) comprises performing stabilization by adding an emulsifier after performing enlarging to obtain the large-diameter conjugated diene rubber latex.

7. The method according to claim 1, wherein, in step (a), the medium-diameter conjugated diene rubber latex is prepared by steps comprising adding an emulsifier, an electrolyte, a molecular weight modifier, and an initiator to 60 to 80 parts by weight of 100 parts by weight of a conjugated diene compound and performing primary polymerization;
   adding 20 to 40 parts by weight of the conjugated diene compound when polymerization conversion rate is 30 to 40% after the primary polymerization step and performing secondary polymerization;
   adding an initiator and a molecular weight modifier when polymerization conversion rate is 55 to 65% after the secondary polymerization step and performing tertiary polymerization;
   adding a redox initiator when polymerization conversion rate is 75 to 85% after the tertiary polymerization step and performing quaternary polymerization; and
   terminating polymerization when polymerization conversion rate is 93 to 99% after the quaternary polymerization step.

8. The method according to claim 1, wherein, in step (b), 85 to 96% by weight of solids of the medium-diameter conjugated diene rubber latex having an average particle diameter of 2,400 to 2,800 Å is added to 4 to 15% by weight of solids of the large-diameter conjugated diene rubber latex to prepare the bimodal conjugated diene rubber latex.

9. A method of preparing a thermoplastic resin composition, comprising:
   preparing the vinyl cyanide compound-conjugated diene rubber-aromatic vinyl compound graft copolymer according to claim 1; and
   feeding 15 to 40% by weight of the prepared graft copolymer and 60 to 85% by weight of an aromatic vinyl compound-vinyl cyanide compound copolymer into an extruder, performing melt-kneading and performing extrusion.

10. A thermoplastic resin composition, comprising 15 to 40% by weight of a graft copolymer comprising a bimodal conjugated diene rubber, an aromatic vinyl compound, and a vinyl cyanide compound and 60 to 85% by weight of an aromatic vinyl compound-vinyl cyanide compound copolymer,
   wherein the bimodal conjugated diene rubber comprises, based on a total weight thereof, 85 to 97% by weight of conjugated diene rubber having an average particle diameter of 2,400 to 2,800 Å, 1 to 14% by weight of conjugated diene rubber having an average particle diameter of 5,800 to 8,500 Å, and 0.1 to 2% by weight of a polymer coagulant, and the thermoplastic resin composition has an Izod impact strength of 32 kgf cm/cm or more as measured using a specimen having a thickness of ¼" according to ASTM D256.

11. The thermoplastic resin composition according to claim 10, wherein the bimodal conjugated diene rubber has an average particle diameter of 3,000 to 3,800 Å.

12. The thermoplastic resin composition according to claim 10, wherein the graft copolymer has a grafting degree of 30 to 45%.

13. The thermoplastic resin composition according to claim 10, wherein the thermoplastic resin composition has a melt index of 20 g/10 min or more as measured under conditions of 220° C. and 10 kg according to ASTM D1238.

* * * * *